Patented June 16, 1931

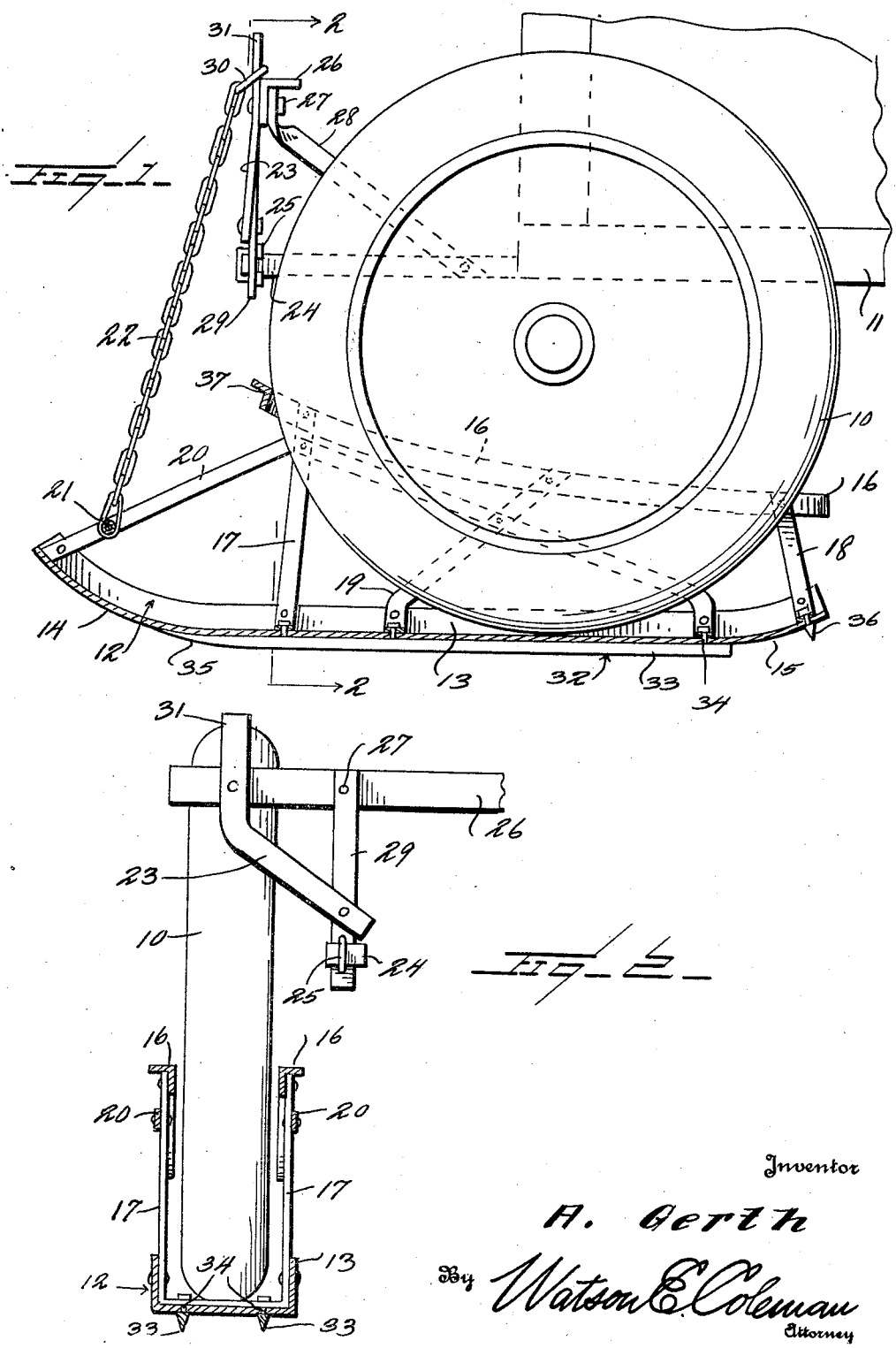

1,810,042

UNITED STATES PATENT OFFICE

AUGUST GERTH, OF DEUEL COUNTY, SOUTH DAKOTA

SNOW RUNNER

Application filed April 19, 1930. Serial No. 445,689.

The present invention relates to snow runners and more particularly to a snow runner which is adapted to be attached to the wheels of a motor vehicle or the like.

An object of this invention is to provide a runner of this character which may be readily attached or detached from the wheel.

Another object of this invention is to provide a runner which may be detachably engaged with the front wheels of the vehicle and is held in operative position by the periphery of the wheel and the weight of the vehicle.

A further object of this invention is to provide a runner having anti side slipping means on the bottom thereof so as to prevent side slipping of the runner.

A still further object of this invention is to provide a runner of this character with means for facilitating the attachment or detachment of the runner from the vehicle.

The above and various other objects and advantages of this invention will in part be described in and in part be understood from the following detailed description of the present preferred embodiment, the same being illustrated in the accompanying drawings wherein:—

Figure 1 is a detail side elevation partly in section of a device constructed according to the preferred embodiment of this invention mounted on a vehicle; and Figure 2 is a sectional view partly in elevation taken on the line 2—2 of Figure 1.

Referring to the drawings wherein like numerals of reference designate corresponding parts throughout the several views, the numeral 10 designates a wheel which is secured to a vehicle and the numeral 11 designates a portion of the chassis or frame upon which the wheels 10 are mounted. At the present time, there are available various types of sled runners or snow runners which may be attached or mounted on the motor vehicle but in most instances the attachment of the sleds requires a considerable amount of time and conversely the detachment of the runners requires a considerable amount of time so that where a vehicle is travelling through the country and where snow is encountered at one point and at another point the ground is bare, it is necessary for the operator of the vehicle to consume a considerable amount of time in attaching or detaching the runners from the vehicle wheels.

In order to provide a runner which may be attached to the wheels of the vehicle, particularly the front wheels, in a moment's time, I have provided a runner generally designated as 12 which may be positioned upon the bottom of the tire and which, when the vehicle is travelling over bare ground, may be readily carried in the vehicle or upon the spare tire at the rear of the vehicle.

The runner 12 comprises a substantially U-shaped sled member 13 which has an upwardly curved forward end 14 and an upwardly curved rear end portion 15. The inner face of the sled member 13 is of a width sufficient to loosely engage about the sides of the tire 10, the periphery of the tire resting upon the inner face of the sled 13 while the upstanding edges of the U-shaped sled engage upon the sides of the tire 10.

In order to firmly hold the runner 13 on the tire, a substantially U-shaped bar 16 is secured to the shoe 13, the bar 16 being secured to the shoe 13 by means of a forward vertically disposed bracing member 17 and a rear bracing member 18, the bracing members 17 and 18 being substantially U-shaped and riveted or bolted at the lower ends to the shoe 13 and at the upper or open ends to the bar 16.

An intermediate brace 19 is secured at one end to the shoe 13 and at the opposite end to the bar 16, the brace 19 being substantially U-shaped and being preferably angularly inclined from the shoe 13. Another bracing member 20 is secured to the shoe 13 and to the bracing members 17 and 19 so as to firmly hold the bracing members 17 and 19 upon the shoe 13 and so as to prevent bending thereof. The bracing member 19 is secured at the forward end to the forward end of the shoe 13 and diverges upwardly and is secured to the bracing member 17 at a point spaced downwardly from the upper end thereof. The bracing member 20 is bent downwardly from the brace 17 and is secured at the rear end thereof to the shoe 13 at a point spaced forwardly of the rear end, being secured by means of bolts, rivets or the like. The bracing member 20 is secured to the brace 19 at a point spaced downwardly from the top thereof.

A transversely disposed bar 21 is secured to the sled 12 between the bracing members 20 which are positioned on the opposite sides of the shoe 13. A chain or flexible member 22 is secured at one end to the horizontal bar member 21 and at the opposite end to a bar 23 which is mounted on the frame of the vehicle, the bar 23 being secured at one end to a bracket member 24 which is mounted on the frame of the vehicle, the bar 23 being secured to the bracket 24 by means of bolts 25 or the like. The bar 23 is attached to a horizontal bar 26, being secured thereto by means of bolts 27 or the like, and a bracing member 28 is secured at one end to the frame 11 of the vehicle and at the opposite end to the bar 26, being secured to the bar 26 by the bolts 27 or the like.

A vertically disposed bar 29 is secured at one end to the horizontal member 26 and at the opposite end to the bracket 24, the bar 29 being adapted to hold the horizontal member 26 in desired relation to the frame and away from the periphery of the tire. The chain securing member 23 extends angularly from the lower end of the vertical bar 29 and is secured to the horizontal bar 26 at a point closely adjacent the outer end thereof in alignment with the center of the tire 10 so that the chain 22 will hold the sled member 12 upon the tire 10 without chafing the tire. The chain 22 may be provided with an attaching hook or member 30 which is adapted to extend into an aperture 31 in the securing bar 23 so that the chain 22 may be detachably secured to the bumper section.

A pair of anti-slipping members generally designated as 32 are secured to the bottom of the shoe 13, the anti-slipping members 32 comprising an elongated V-shaped bar 33 which is secured to the shoe 13 by means of bolts or rivets 34, and the forward end of the anti-slipping members 33 are preferably tapered or reduced as at 35 and are curved upwardly so as to lie against the curved forward end portion of the shoe 13. The forward end of the anti-slipping members 32 preferably terminate at a point spaced rearwardly from the forward end of the shoe 13, and the rear end of the anti-slipping members 32 terminates at a point spaced forwardly of the curved rear end portion 15 of the shoe.

A plurality of studs or headed members 36 are secured to the shoe 13 adjacent the rear end thereof and are positioned in the upwardly curved portion 15 at a point spaced rearwardly from the rear end of the anti-slipping members 32. The anti-slipping members 32 and the studs 36 may be removably secured in the shoe 13 so that when they become dulled or unduly worn they may be removed from the shoe and replaced. The studs 36 are adapted to facilitate the placement or displacement of the shoe 13 beneath the tire and when the shoe 13 is positioned beneath the tire, the studs 36 are adapted to be positioned out of engagement with the ground or the snow so as not to obstruct the free passage of the shoe 13 thereover.

In the operation of this device, the flexible member 22 may be hooked onto the bar member 23 in the aperture 31 and the rear end of the shoe placed against the periphery of the tire and in angular relation to the surface of the ground.

The studs 36, when the forward end of the shoe is raised, will contact with the ground and in order to mount the shoe 13 upon the tire it will only be necessary to move the vehicle forwardly, the tire 10 riding upon the shoe 13 and the studs 36 extending into the road or ice so as to prevent the wheel or tire 10 from pushing the shoe forwardly. As the tire 10 moves forwardly on the shoe 13, the shoe will be lowered at the forward end thereof until the tire is positioned entirely upon the shoe and the forward end of the tire engages against the forward looped end 37 of the bar member 16.

The flexible member 22 is adapted to prevent the forward end of the sled 12 from rocking unduly and so as to help maintain the sled member about the tire. The looped portions 37 of the tire engaging member 16 will prevent the rearward movement of the sled with respect to the tire 10 so that when the vehicle is moved forwardly, the shoe 13 will coactively move forwardly therewith.

In order to remove the sled member 12 from the vehicle, it is only necessary to back the vehicle, which backward movement will cause the tire or wheel 10 to move out of the looped tire engaging member 16 and coactively rock the shoe 13 on the curved rear portion 15, the rocking movement of the shoe 15 raising the forward end thereof and bringing the studs 36 into engagement with the surface of the ground. When the studs 36 engage the ground, the sled members 12 will be prevented from moving rearwardly with the vehicle and the forward end will accordingly be raised by the flexible member 23.

When the sled members 12 have been disengaged from the wheel they may be unhooked from the bumper member 26 and placed in the vehicle for further use when desired. In the forward movement of the sled member 12 over the ground, the anti-slipping members 32 will prevent side slipping of the shoes 13.

It will, of course, be understood that various changes and modifications may be made in the details of construction and design of the above specifically described embodiment of this invention without departing from the spirit thereof, such changes and modifications being restricted only by the scope of the following claims.

What is claimed is:—

1. A snow runner of the character described comprising a shoe, a U-shaped tire engaging member, bracing means for mounting said tire engaging member on the shoe, anti-slipping means mounted on the lower surface of the shoe, and means carried by the shoe for facilitating placement or displacement of the shoe from the wheel, said latter means projecting downwardly from said shoe and being normally out of engagement with the ground.

2. A snow runner of the character described comprising a substantially U-shaped shoe having upwardly curved forward and rearward end portions, a U-shaped tire engaging member, bracing means for securing said tire engaging member on said shoe, a pair of spacedly positioned anti-slipping members secured to the bottom of said shoe, and lug means mounted on the shoe adjacent the rear end portion thereof and adapted to facilitate placement or displacement of the shoe on the tire, said lug means being normally out of engagement with the ground when the shoe is positioned beneath the wheel.

3. A snow runner of the character described comprising a shoe, anti-slipping means mounted on the bottom of the shoe for preventing side slipping thereof, tire engaging means mounted on the shoe and adapted to prevent rearward movement thereof beneath the wheel, a flexible member secured to the forward end of the shoe, means carried by the shoe for facilitating placement or displacement of the shoe beneath the wheel, and means for securing said flexible member to the frame of the vehicle, said flexible member being adapted to align the shoe beneath the wheel and cooperatively limit the rocking movement of the shoe beneath the wheel, said first-named means projecting downwardly from the rear end of the shoe and being normally out of engagement with the ground.

In testimony whereof I hereunto affix my signature.

AUGUST GERTH.